March 13, 1945. M. C. LONG 2,371,337
HYDRAULIC TORQUE CONVERTER
Filed April 27, 1942 3 Sheets-Sheet 1

INVENTOR.
Marshall C. Long
BY
ATTORNEY.

March 13, 1945.  M. C. LONG  2,371,337
HYDRAULIC TORQUE CONVERTER
Filed April 27, 1942   3 Sheets-Sheet 2

INVENTOR.
Marshall C. Long
BY
ATTORNEY.

March 13, 1945.  M. C. LONG  2,371,337
HYDRAULIC TORQUE CONVERTER
Filed April 27, 1942   3 Sheets—Sheet 3

INVENTOR.
Marshall C. Long
BY
ATTORNEY.

Patented Mar. 13, 1945

2,371,337

UNITED STATES PATENT OFFICE 2,371,337

HYDRAULIC TORQUE CONVERTER

Marshall C. Long, Kansas City, Mo.

Application April 27, 1942, Serial No. 440,619

4 Claims. (Cl. 60—54)

This invention relates to hydraulic torque converters of the character wherein the parts are formed and disposed to create an assembly that approaches the characteristics of a fluid drive when a low differential in speed between drive and driven shafts is established, and to approach the characteristics of a torque converter when there is a high differential in speed between the drive and the driven shafts.

A yet further primary object of this invention is to provide an hydraulic torque converter of the aforementioned character having differential gearing as a component part thereof, whereon a guide vane is mounted which contributes to accomplishing the result of changing the nature of the mechanism from that of a fluid drive to that of a torque converter.

A still further aim of this invention is to provide an hydraulic torque converter that eliminates entirely all external or supplementary devices for holding any of the vanes against rotation in a direction that would prevent the device from developing a high initial starting torque with a relatively constantly high efficiency of power transmission throughout its entire speed range.

This invention has for a further aim the provision of a torque converter wherein the connection between the input and output shafts at all ranges of speed, is the fluid within the converter being directed through a continuous spiral path of travel extending around the aligned axes of the drive and driven shafts, one set of vanes forming a part of the converter being formed to reverse the direction of flow of the fluid within a passageway therefor, whereby at least two forward factors of kinetic energy are established.

An even further object of this invention is the provision of a torque converter capable of approaching the characteristics of a fluid coupling, when the torque requirements have been met, and able to revert to a true torque converter, having a number of torque ratios when the load on the driven shaft requires such a condition.

Additional and important objects of this invention will appear during the course of the following specification referring to the accompanying drawings wherein.

Figure 1:
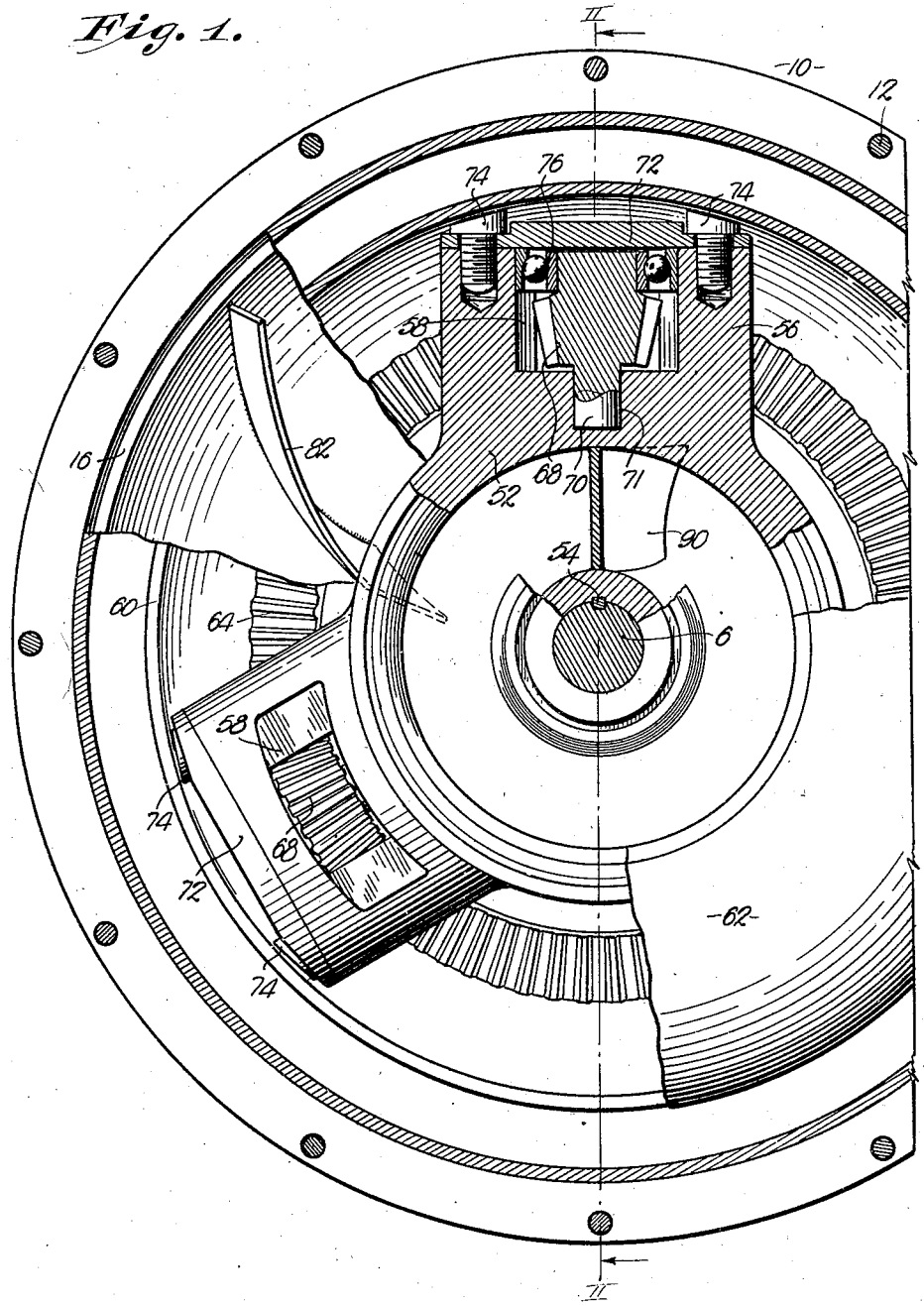
Fig. 1 is a fragmentary side elevational view of an hydraulic torque converter embodying the invention, parts being broken away for revealing relation of the parts.

The hydraulic torque converter and fluid coupling made in accordance with this invention, is usable wherever smooth, efficient transmission of power is desired and may be a part of such apparatus as automotive equipment. Located at the juncture of driving shaft and driven shaft 6 and 8 respectively, is a housing 10 comprising two sections joined by machine bolts or analogous means 12 to create a rigid element secured to driving shaft 6 by key 14. The part of housing 10 which circumscribes driven shaft 8 is held in operative relation thereto by collar 7 and bearing race 9.

Housing 10 is hollow and annular in character to better receive a shell having a number of parts 16, 18 and 20 respectively. Parts 16 and 20 are formed with annular ribs 22 and 24 respectively, complementary in contour to grooves 26 and 28 respectively, created in housing 10. Such structure establishes an oil seal.

The reduced terminal portion of driving shaft 6 presents a shoulder 30 against which bearing race 32 is positioned to preclude its movement in one direction longitudinally of the driving shaft 6. Part 16 of the shell is mounted on this bearing race 32 by retaining ring 34 held in place by machine bolts 36 and annular shoulder 38.

The second part 18 of the shell within the housing 10 has one of its annular edges adjacent to the inner similar edge of part 16. The other annular edge of part 18 is disposed adjacent to internal shoulder 40 on the inner face of housing 10.

The third part 20 of the inner shell is secured to the driven shaft through the medium of collar 7, flange 42 thereof, and machine bolts 44. Key 46 serves as means for joining collar 7 and shaft 8.

A bearing race 47 at the inner end of shaft 6 is interposed between part 20 and said shaft 6. Retaining cap 48, held in place by bolt 50 precludes movement of race 46 in one direction longitudinally of shaft 6. Movement of both the race 47 and previously described race 32 in a direction toward each other, is precluded by the interposed spider 52 keyed to the driving shaft 6 as at 54. This spider has a hub portion directly circumscribing the shaft 6 and an annular portion spaced from the hub portion (Fig. 1). Radial bosses 56, each having a cavity 58 therein are between a pair of annular sections 60 and 62 respectively, whereon are formed ring gears 64 and 66 respectively. An idler gear 68 is in each cavity. These idler gears 68 are developed on spindles 70 journalled in recesses 71 in spider 52, one being at the bottom of each cavity 58. A plate 72, held in place by bolts or the like 74 removably retain a race 76 in operative relation with each idler gear 58, as illustrated in Fig. 1.

An oil seal of the character hereinabove described is provided as at 78 and 80 between spider 52, parts 16 and 20, and annular sections 60 and 62.

From the above description of certain of the elements of the torque converter, it will be apparent that an annular fluid passage is established within the housing 10 that is ring-shaped in transverse cross section.

Within this fluid passage is mounted a series of impeller vanes 82 disposed at an angle between part 16 and annular section 60. The longitudinal edges of these vanes 82 are welded or otherwise rigidly secured to part 16 and section 60 whereby the same must simultaneously move about the aligned axes of shafts 6 and 8.

A series of first-stage runner vanes 84 are between part 18 of the shell and the annular section 62. A group of guide vanes 86 within the aforesaid fluid passage are mounted on housing 10. A series of second stage runner vanes 88 have their inner edges welded to section 62 as do vanes 84. The outer edges of vanes 84 are rigid to shell part 18, however, while the other edges of runner vanes 88 are rigid to part 20 of the shell.

Figure 2:
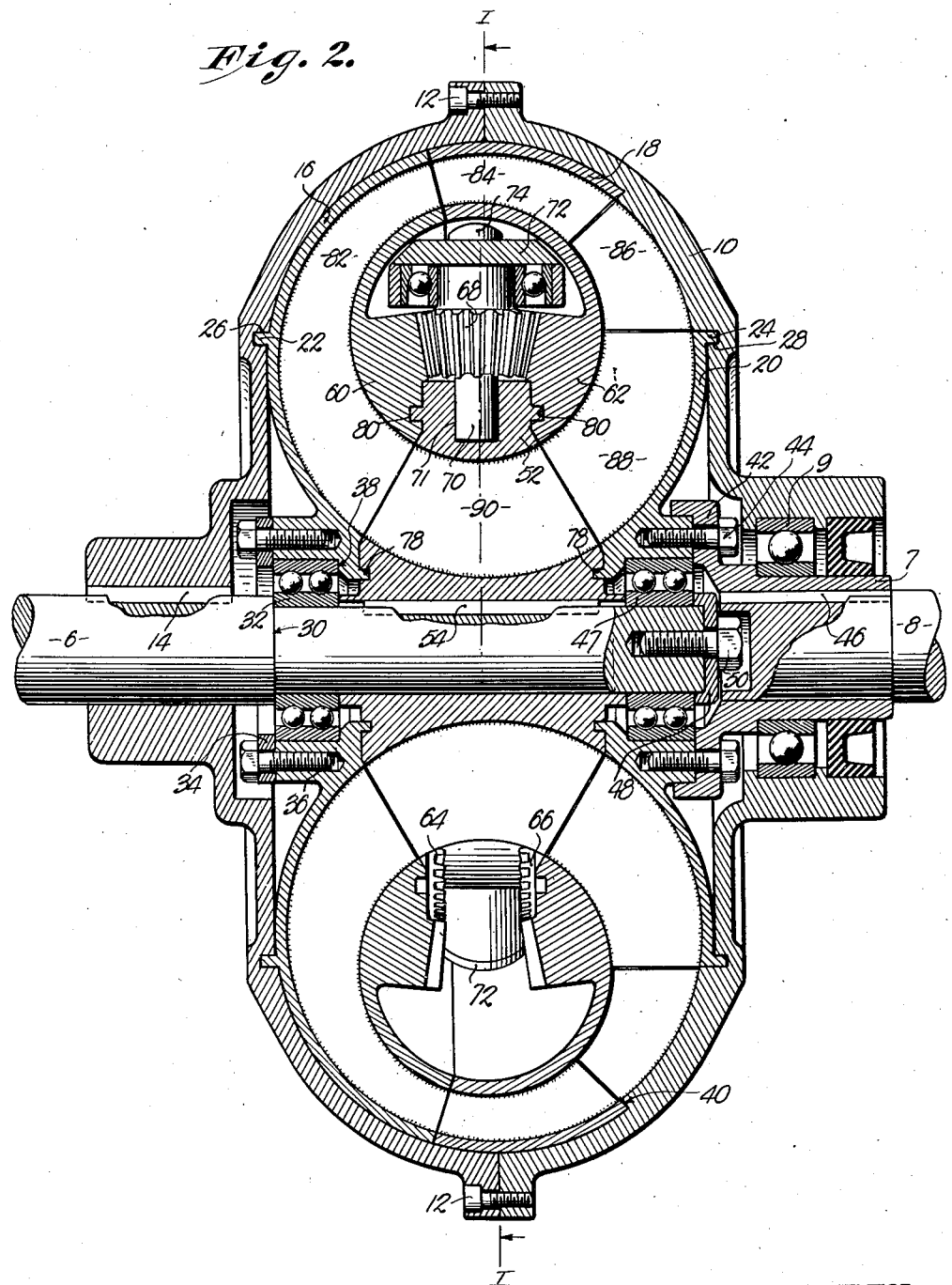
Fig. 2 is a cross sectional view through the torque converter taken on line II—II of Fig. 1.
Figure 3:
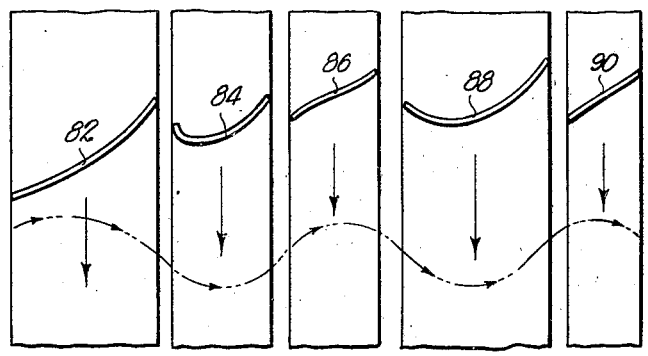
Fig. 3 is a development in plane of the impeller, guide and runner blades, and illustrating the hydraulic circuit.

A second group of guide vanes 90 is within the fluid passage but between the inner and outer portions of spider 52. Reference to Fig. 2 indicates the manner of mounting all the vanes but in this illustration, only the area occupied by the vanes is shown. The form of the several vanes must be such as to cause the fluid to flow through the space in an endless spiral path of travel, the guide vanes serving to reverse the flow to cause an impingement against all runner vanes in the same direction around the axis of driven shaft 8.

The positioning of a group of guide vanes 90 of the type described, on the spider 52 forming a part of the differential (ring-gears 64, 66 and idler gears 68), causes a gradual change in the characteristics of the device from those of a torque converter to those of a fluid drive. This is brought about by the rotational speed of the impeller vanes 82 being dependent upon some differential in speed between the driving shaft 6 and driven shaft 8. At low driven shaft speed, the greater differential provides a relatively greater impeller speed. Conversely at high driven shaft speed, the lesser differential established provides a relatively lesser impeller speed. This changing ratio of relative speeds between the various elements of the torque converter causes the characteristics to vary from those of a torque converter at relatively high differential to those of a fluid coupling at relatively low differential speeds.

To one skilled in the art it will be obvious that kinetic energy imparted to the fluid by impeller vanes 82, driven differentially by shaft 6, will be absorbed in runner vanes 84, by which some moment of torque will be applied to shaft 8. Fluid leaving runner vanes 84 at some reduced velocity has its direction of travel reversed by guide vanes 86 so that upon striking runner vanes 88 an additional moment of torque is applied to shaft 8. Upon entering guide vanes 90, the direction of fluid travel is again reversed, which additional torque benefit is applied within the enclosed fluid system to the energy imparted to that system by the impeller vanes 82.

Figure 4:
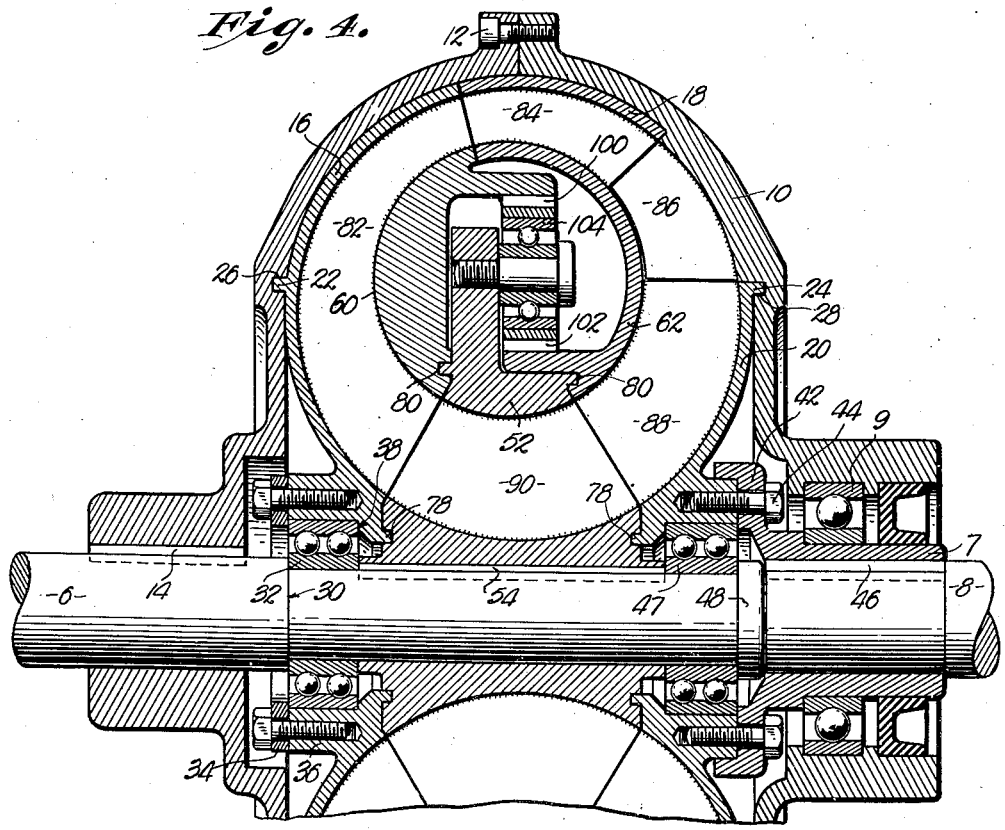
Fig. 4 is a fragmentary central sectional view through a portion of an hydraulic torque converter made to embody a modified form of the invention.

In the illustrated embodiment of the modified form of the invention, shown in Fig. 4, the parts throughout are identical with the exception of the specific form of ring gears 100 and 102 on annular sections 60 and 62, respectively. Idler gears 104 are between ring gears 100 and 102 and are mounted for free rotation on spider 52 as is the case in the form shown in Figs. 1 and 2. The same result is obtained through employment of this arrangement and type of parts even though gears 100, 102 and 104 are not of the bevel type.

Having thus described the invention, what is claimed as new and desired to be secured by Letters Patent is:

1. In an hydraulic converter, a driving shaft; a driven shaft in longitudinal alignment with the driving shaft; a hollow annular housing rigid to the driving shaft and circumscribing the same; a multipart, annular shell circumscribing the driving shaft and disposed immediately adjacent to the housing; a pair of opposed annular, transversely arched sections within the shell and spaced therefrom to provide therewith an annular fluid passage, ring-shaped in transverse cross section; a spider rigid to the driving shaft and extending radially between the sections; opposed ring gears on the inner faces of the sections; idler gears mounted for free rotation on the spider, in mesh with the ring gears; and a series of vanes in the said fluid passage, comprising impeller vanes between and secured to one part of the annular shell and one of the sections of said pair thereof; a series of runner vanes between and secured to a second part of the annular shell and the other of the sections of said pair thereof, said second part of the shell being keyed to the driven shaft, a second series of runner vanes between and secured to an arched part of the annular shell and the other of the sections of said pair thereof, and a group of guide vanes rigid to the housing and disposed between the first series of runner vanes and the second series thereof within the fluid passage to direct fluid from the former to the latter.

2. In an hydraulic converter, a driving shaft; a driven shaft in longitudinal alignment with the driving shaft; a hollow annular housing rigid to the driving shaft and circumscribing the same; a multipart, annular shell circumscribing the driving shaft and disposed immediately adjacent to the housing; a pair of opposed annular, transversely arched sections within the shell and spaced therefrom to provide therewith an annular fluid passage, ring-shaped in transverse cross section; a spider rigid to the driving shaft and extending radially between the sections; opposed ring gears on the inner faces of the sections; idler gears mounted for free rotation on the spider, in mesh with the ring gears; and a series of vanes in the said fluid passage, comprising impeller vanes between and secured to one part of the annular shell and one of the sections of said pair thereof, a series of runner vanes between and secured to a second part of the annular shell and the other of the sections of said pair thereof, said second part of the shell being in fixed relation with the driven shaft, a second series of runner vanes between and secured to an arched part of the annular shell and the other of the sections of said pair thereof, a group of guide vanes rigid to the housing and disposed between the first series of runner vanes and the second series thereof within the fluid passage to direct fluid from the former to the latter, and a second group of guide vanes on the spider within the fluid passage to direct fluid from the respective runner vanes of the second group thereof toward the respective impeller vanes.

3. In an hydraulic converter, a driving shaft; a driven shaft in longitudinal alignment with the driving shaft; a hollow annular housing rigid to the driving shaft and circumscribing the same; a multipart, annular shell circumscribing the driving shaft and disposed immediately adjacent to the housing; a pair of opposed annular, transversely arched sections within the shell and spaced therefrom to provide therewith an annular fluid passage, ring-shaped in transverse cross section; a spider rigid to the driving shaft and extending radially between the sections; opposed ring gears on the inner faces of the sections; idler gears mounted for free rotation on the spider, in mesh with the ring gears; and a series of vanes in the said fluid passage, comprising impeller vanes between and secured to one part of the annular shell and one of the sections of said pair thereof, a series of runner vanes between and secured to a second part of the annular shell and the other of the sections of said pair thereof, said second part of the shell being in fixed relation with the driven shaft, a second series of runner vanes between and secured to an arched part of the annular shell and the other of the sections of said pair thereof, a group of guide vanes rigid to the housing and disposed between the first series of runner vanes and the second series thereof within the fluid passage to direct fluid from the former to the latter, and a second group of guide vanes on the spider within the fluid passage to direct fluid from the respective runner vanes of the second group thereof toward the respective impeller vanes, said impeller blades, said two series of runner vanes, and said two groups of guide vanes being formed to direct fluid through the passage in a spiral, circumscribing endless path.

4. In an hydraulic torque converter, a driving shaft; a driven shaft in longitudinal alignment with the driving shaft; a hollow annular housing rigid to the driving shaft and circumscribing the same; a multipart, annular shell circumscribing the driving shaft and disposed immediately adjacent to the housing; means for operably connecting one of said parts of the shell with the driven shaft; a pair of opposed annular, transversely arched sections within the shell and spaced therefrom to provide therewith an annular fluid passage, ring-shaped in transverse cross section; a spider rigid to the driving shaft and extending radially between the sections; opposed ring gears on the inner faces of the sections; idler gears mounted for free rotation on the spider, in mesh with the ring gears; and a series of vanes in the said fluid passage, said series of vanes including a group of impeller vanes, a group of runner vanes, and a group of guide vanes having curved surfaces for directing fluid through an endless spiral path of travel and against certain of the remaining vanes of the series, the guide vanes of the group thereof being disposed to reverse the direction of fluid travel to create additional torque over that imparted to the driven shaft by fluid impinging upon the impeller vanes.

MARSHALL C. LONG.